(12) United States Patent
Zhang et al.

(10) Patent No.: US 6,943,964 B1
(45) Date of Patent: Sep. 13, 2005

(54) SINGLE ELEMENT LASER BEAM SHAPER

(75) Inventors: Shukui Zhang, Yorktown, VA (US);
Michelle D. Shinn, Newport News, VA (US)

(73) Assignee: Southeastern Univ. Research Assn., Newport News, VA (US)

( * ) Notice: Subject to any disclaimer, the term of this patent is extended or adjusted under 35 U.S.C. 154(b) by 60 days.

(21) Appl. No.: 10/858,143

(22) Filed: Jun. 1, 2004

(51) Int. Cl.[7] ............................................. G02B 13/18
(52) U.S. Cl. ..................................... 359/708; 359/718
(58) Field of Search ................................ 359/708, 709, 359/710, 711, 712, 718

(56) References Cited

U.S. PATENT DOCUMENTS 5,796,520 A * 8/1998 Maruyama .................. 359/565
5,969,862 A * 10/1999 Maruyama .................. 359/565

* cited by examiner

Primary Examiner—Timothy Thompson

(57) ABSTRACT

A single lens laser beam shaper for converting laser beams from any spatial profile to a flat-top or uniform spatial profile. The laser beam shaper includes a lens having two aspheric surfaces. The beam shaper significantly simplifies the overall structure in comparison with conventional 2-element systems and therefore provides great ease in alignment and reduction of cost.

4 Claims, 4 Drawing Sheets

SINGLE ELEMENT LASER BEAM SHAPER

The United States of America may have certain rights to this invention under Management and Operating contract No. DE-AC05-84ER40150 from the Department of Energy.

FIELD OF THE INVENTION

The present invention relates to a system for shaping a laser beam and particularly to a system that converts a laser beam from a non-uniform profile to uniform flat-top distribution with a single aspherical lens.

BACKGROUND OF THE INVENTION

Most laser devices typically produce Gaussian or similar beam profiles. However, it is desirable in many laser applications, such as holography, material processing, and lithography, to create a laser beam having a uniform spatial profile to insure uniform illumination of laser energy on the target.

A laser beam having a uniform spatial profile, typically referred to as a flat-top beam, can be obtained by refractive, diffractive, or absorptive elements. Among these methods, the refractive system presents many advantages, including high efficiency, simple structure, and less wavelength dependence, which are essential for high power lasers.

A widely-used refractive laser beam shaper consists of two separate aspherical lenses as shown in FIG. 1. Although this optical system is neither difficult to align or complex, a single lens system, if it exists and does the same job, will be much preferred, especially if it can be mass produced.

What is needed for converting laser beams from Gaussian, or any other spatial distribution, to a flat-top profile is a beam shaper that is simpler to install and simpler to produce and consolidates the beam reshaping function into one single lens.

SUMMARY OF THE INVENTION

The present invention is a single lens laser beam shaper for converting laser beams from a Gaussian profile, or any other spatial distribution, to a flat-top or uniform spatial profile. The laser beam shaper includes a lens having two aspheric surfaces. The beam shaper significantly simplifies the overall structure in comparison with conventional 2-element systems and therefore provides great ease in alignment and reduction of cost. The method described herein applies to beams with any spatial distribution and is not limited by the typical Gaussian distribution.

DETAILED DESCRIPTION

Figure 1:
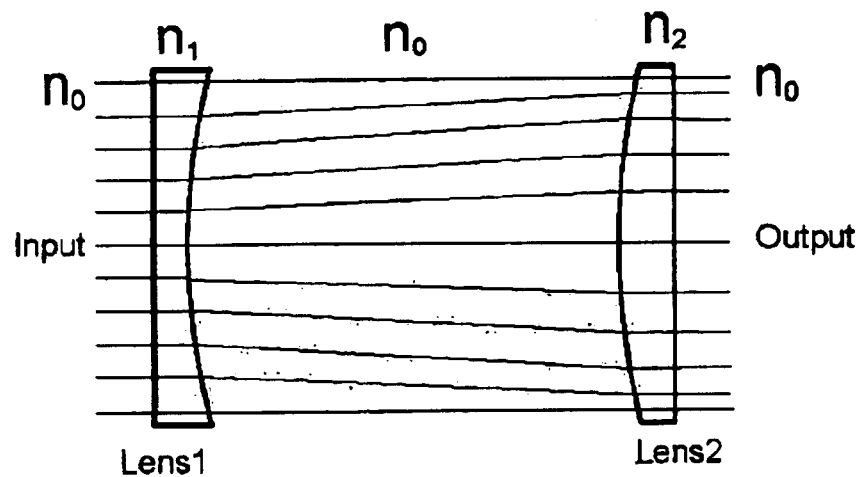
FIG. 1 is a conceptual view of a conventional 2-element beam reshaping system.

Description of the Present State of the Art:

Referring to FIG. 1, a conventional 2-element laser beam shaping system is depicted. The conventional laser beam shaper consists of two separate lenses Lens1 and Lens2. Each lens includes one plano or flat surface and one aspheric surface. The first and second lenses Lens1, Lens2 each include one plano surface and one aspheric surface. Although the conventional laser beam shaping system 10 of FIG. 1 is neither difficult to align or complex, a single lens system, if it exists and achieves the same result, will be much preferred.

The conventional design shown in FIG. 1 has been proposed by Shealy in Dickey, et al., "Laser Beam Shaping—Theory and Techniques", pp. 163–211, Marcel Dekker, Inc., New York, 2000 (hereinafter Dickey, et al.) and by Frieden, F. M., "Lossless conversion of a Plane Laser Wave to a Plane Wave of Uniform Irradiance", Applied Optics, pp. 1400–1403, Vol. 4, November 1965.

In the conventional 2-element laser beam shaping system shown in FIG. 1, two aspherical lenses Lens1, Lens2 are coaxially placed apart at a specified distance. The collimated input rays are refracted on the first lens and then recollimated by the second lens. Since the rays near the axis experience larger radial magnification than those near the edge, the intensity across the beam is non-linearly redistributed and a uniform flat-top profile is produced.

Description of the Current Invention:

In order to explain the theory behind the single lens beam shaper of the present invention, it is necessary to solve the appropriate mathematical equations. Mathematical details can be found in Dickey, et al. and in Jiang, et al., "Design and Testing of a Refractive Reshaping System", Proc. SPIE 2000, 64, 2000. To have a uniform collimated output spatial profile and maintain the original wavefront, two conditions must be met: 1) the output must be a constant and 2) all rays must maintain the same optical path length (OPL).

Figure 2:
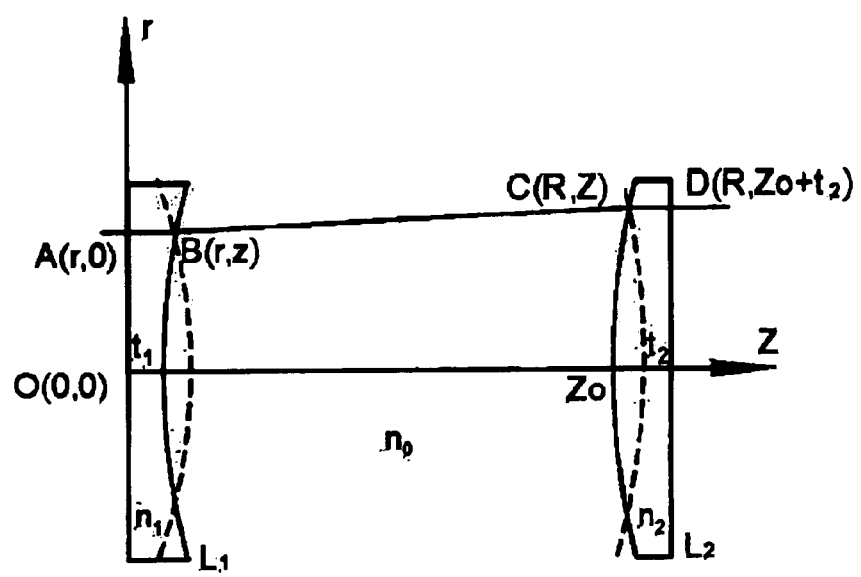
FIG. 2 is a geometric configuration of a beam reshaping system.

With reference to FIG. 2, assume a ray, starting from point A through the first lens $L_1$ with refraction index $n_1$, propagates through a medium having refraction index $n_0$ and is refracted again at the aspheric surface of the second lens $L_2$. As shown in FIG. 2, r and z are the radial and axial values of the first aspheric surface, respectively, and R and Z are the corresponding radial and axial values for the second aspheric surface. If the input energy density is Ei(r) and the maximum beam radius is $r_0$, then it follows from the energy conservation that:

$$R = \left[(2/E_0)\int_0^{r_0} Ei(r)r\,dr\right]^{1/2} \quad (1)$$

In Equation (1), r is the radius of the beam at lens $L_1$, R is the radius of the beam at lens $L_2$, and $E_0$ is the output energy density which is a constant and will be decided by the system magnification factor M=R/r. Applying Snell's Law at both refractive surfaces and performing ray transform yields the following differential equation:

$$(z')^4[\gamma_1^2(R-r)^2+(\gamma_1^2-1)(Z-z)^2]-(z')^3[2(R-r)(Z-z)]$$

$$-(z')^2(1-\gamma_1^2)[(R-r)^2+(Z-z)^2]-z'[2(R-r)(Z-z)]-(R-r)^2=0 \quad (2)$$

In Equation (2) shown above z'=dz/dr, $\gamma_1=n_1/n_0$. The constant optical path requires that the OPL of any arbitrary ray be equal to the OPL of the central ray, which leads to:

$$C(\text{constant}) = n_1 t_1 + (Z_0 - t_1)n_0 + n_2 t_2 = \quad (3)$$
$$n_1 z + n_0[(R-r)^2 + (Z-z)^2]^{1/2} + n_2(Z_0 + t_2 - Z)$$

Equation (3) can be solved to give:

$$Z = (n_2^2 - n_0^2)^{-1}\{[(n_1 n_2 - n_0^2)z + n_2 C] \pm$$
$$n_0[(C + n_1 \gamma_1 n_2 z)^2 + (n_2^2 - n_0^2)(R-r)^2]^{1/2}\} \quad (4)$$

A similar calculation on the second surface at point B(R, Z) results in:

$$Z' = z'\gamma_2\{\gamma_1 - [1 + (z')^2(1-\gamma_1^2)]^{1/2}\}$$
$$/\{1 + (z')^2 - \gamma_1\gamma_2(z')^2 - \gamma_2[1+(z')^2(1-\gamma_1^2)]^{1/2}\} \quad (5)$$

In Equation (5) $Z' = dZ/dr$, $\gamma_2 = n_0/n_2$. The solutions to Equation (1) through Equation (5) will give the exact profiles for the two surfaces on the first $L_1$ and the second $L_2$ lens. Equation (2) can be further simplified to a quadratic equation which has the following roots:

$$z' = \{(R-r)(Z-z) \pm \gamma_1(R-r)[(Z-z)^2 + (R-r)^2]^{1/2}\}/[(\gamma_1^2 - 1)(Z-z)^2 + \gamma_1^2(R-r)^2] \quad (6)$$

In Equation (6), r and z are the corresponding radial and axial values of the first aspheric surface, R and Z are the corresponding radial and axial values for the second aspheric surface, and $\gamma_1 = n_0/n_1$.

Equation (6) is differential equation and can be solved numerically. The plus and minus signs in Equation (6) represent the different configurations. All previous reports have involved solutions for the positive roots of Equation 6, which involves solving the equation using the positive signs. Solving the equation for the positive roots forces the index of refraction between the two surfaces to be less than the index of refraction beyond those surfaces. Thus, when choosing the positive roots of the equation, there are two optical elements.

For the single element beam shaper of the present invention, Equation (6) is solved for the negative roots, or using the negative signs. This requires the index of refraction between the two surfaces to be greater than the index of refraction beyond the two surfaces. The dotted lines in FIG. 2 refer to the case where minus signs are taken from the equation. Apparently the rays are expected to be divergent after the first lens.

Assuming the first refractive surface is convex and the second one is concave to the incoming rays, then the positive root has to be taken in Equation (6) and also the plus sign for Equation (4) under the condition that $n_1 > n_0 < n_2$ holds. This means that rays get defocused at the first surface and recollimated because of the focusing effect at the second refractive surface.

The negative root in Equation (6) indeed does not make sense in the configuration mentioned above where $n_1 > n_0 < n_2$ has been assumed. But it does represent the correct solution in the case of $n_1 < n_0 > n_2$. If $n_1 = n_2 = 1$ and $n_0 > 1$, then the net result will be exactly the same as rays coming from air, entering and refracted by a lens having refractive index $n_0$ before exiting into air again. In this case the minus sign in Equation (4) has to be taken, corresponding to a convex surface, which is illustrated with dotted lines in FIG. 2.

Figure 3:
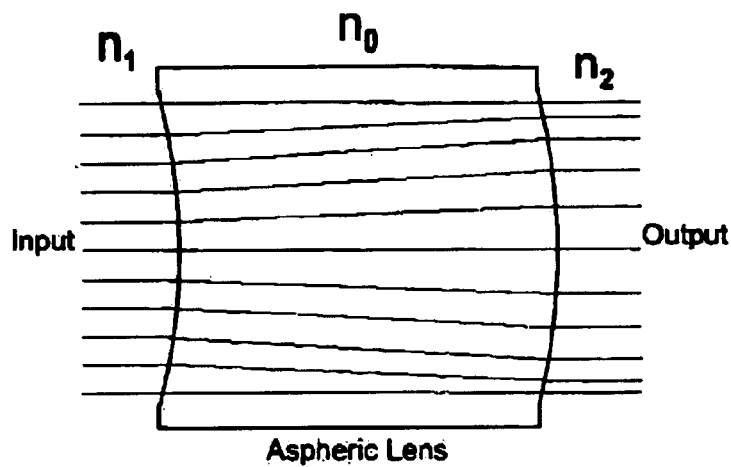
FIG. 3 is a conceptual view of a single-element beam reshaping system according to the present invention.

Referring to FIG. 3, an optical schematic is shown of a single-lens beam shaper system for flat-top profiles according to the present invention. The single-lens system converts the non-uniform input spatial distribution into a uniform flat-top one. The single optical element depicted in FIG. 3, with both incident surfaces aspheric, can be used to transform a Gaussian input beam profile to a uniform output.

In principle, the input beam spatial profile can be arbitrarily chosen. More specifically, the initial input beam spatial profile is taken to be a Gaussian beam shape expressed by $Ei(r) = \exp(-2r^2/r_0^2)$, where $r_0$ is the beam radius and where the intensity falls to $e^{-2}$ of its maximum.

Figure 4:
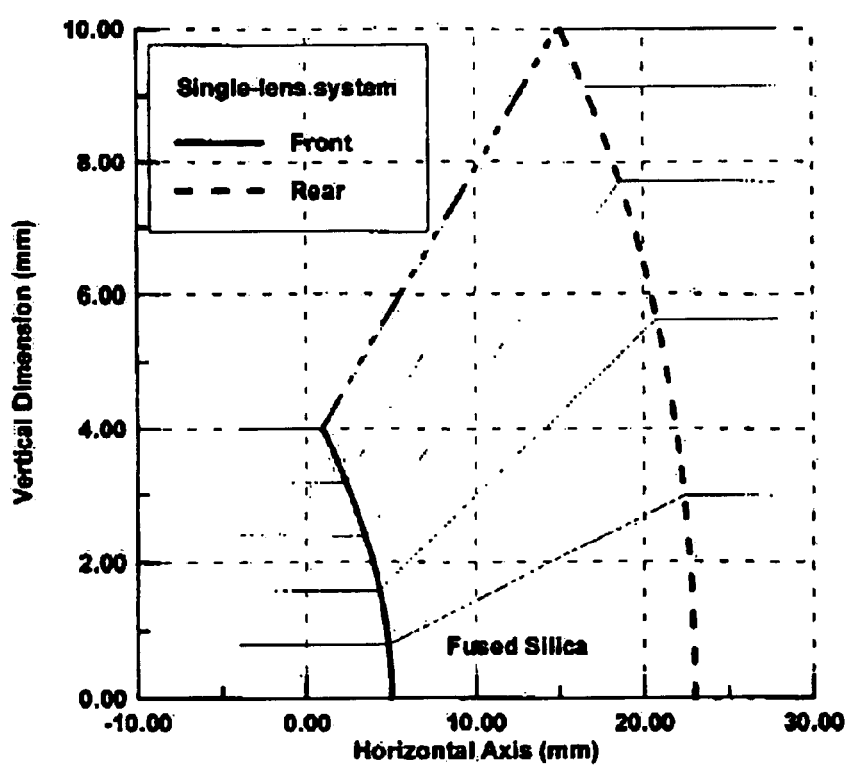
FIG. 4 is a graphical depiction showing the calculated lens surfaces of a single-element beam reshaping system.

With reference to FIG. 4, in a first example of the single-lens system, the lens substrate is fused silica, the input beam radius is 4, and the output beam radius is 10. FIG. 4 depicts the calculated lens surface profiles along with the ray trace of a single-element beam reshaping system having the stated parameters.

Figure 5:
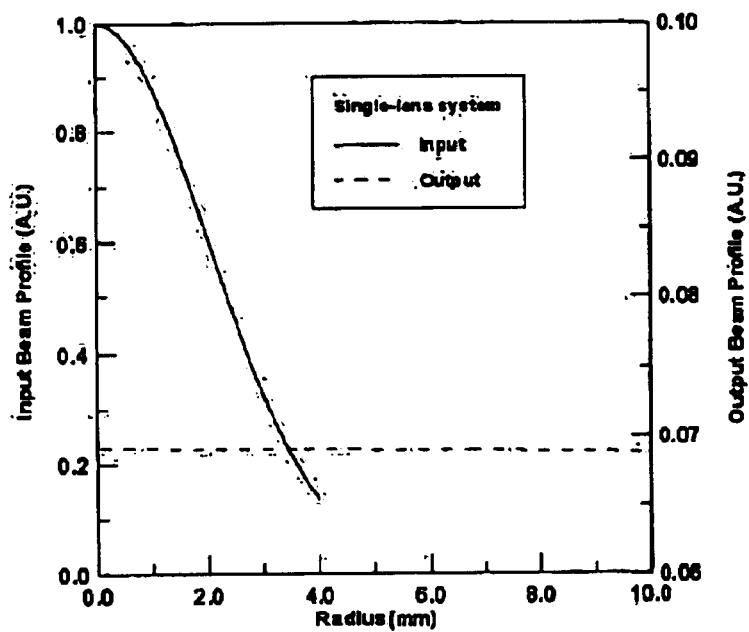
FIG. 5 is a graph showing beam intensity profiles before and after a single-element beam reshaping system.

The intensity distribution before and after the shaping system of FIG. 4 is depicted in FIG. 5. A non-uniform input beam profile has been converted to a uniform flat-top profile at reduced intensity, which is determined by the beam magnification. The wavelength for all calculations is 527 nm.

Ray tracing was done to judge the performance of the single-element beam shaping system and to examine the profile variation caused by actual deviations from the ideal input beam. Results are given in FIG. 6. Three Gaussian input profiles I1, I2, and I3 are shown and one I4 described by $\text{sec h}^2 (a_s r/r_s)$, where $r_s$ is the beam radius at $e^{-2}$ of maximum and $a_s = 1.657$. The output profiles are represented by O1, O2, O3, and O4. The ideal input beam is I2.

Figure 6:
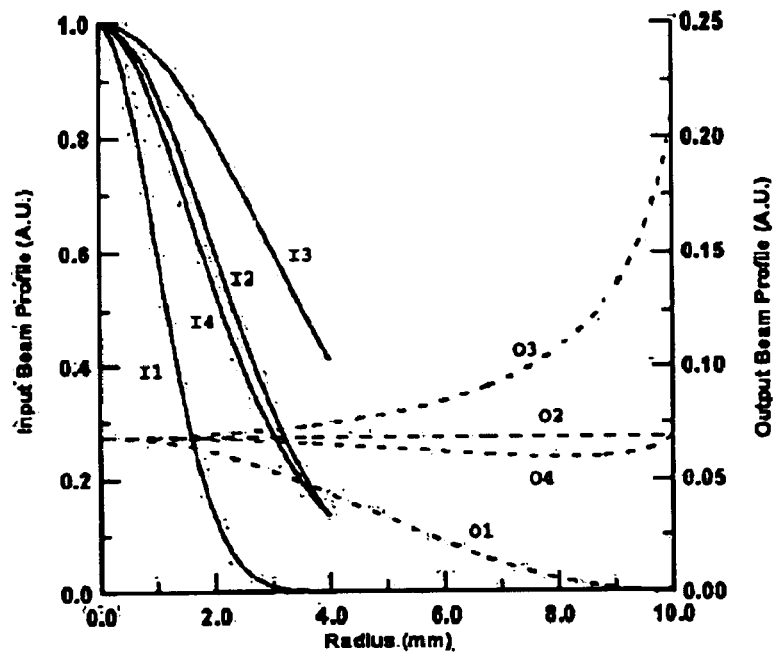
FIG. 6 is a graph depicting beam profile variations caused by input beam profiles for a single-lens reshaping system designed for input I2.

When the two input profiles are close to each other, as denoted by I2 and I4 in FIG. 6, the deviation at the output O2, O4 is very small across the whole aperture. The inputs with large deviation from the desired input profile results in obvious non-uniformity at the output. But even with large variation, the output uniformity within a certain radius is still superior to the beam resulting from a Gaussian profile cut by a hard aperture.

Figure 7:
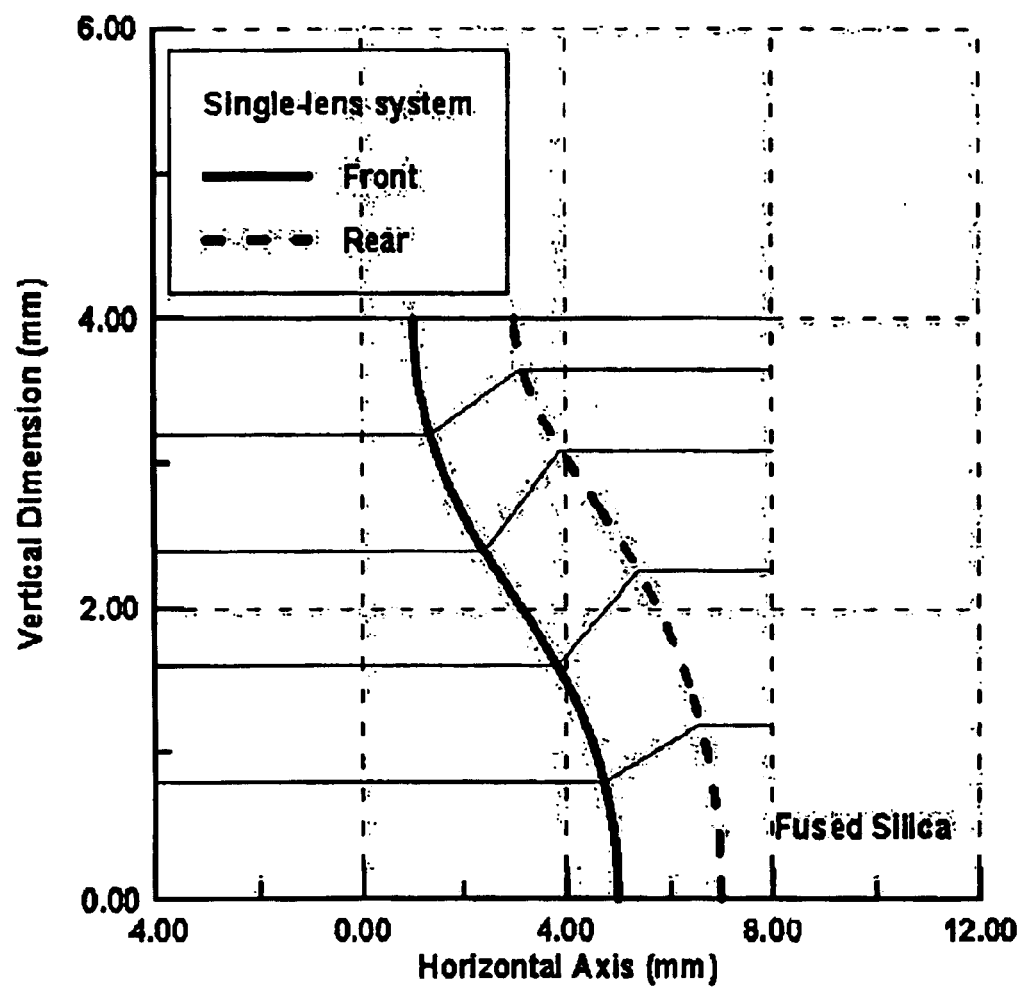
FIG. 7 is a graph depicting the design for a thin beam shaper with 1:1 magnification.

Although the lens thickness for a single-element beam shaping system may be considerably larger than the thickness of each separate lens in a 2-element beam shaping system in the case of ultrashort pulse lasers, it should not be critical for picosecond or longer laser pulses. In the case of a single-element beam shaping system for picosecond or longer pulses, the overall material length can be reduced to a minimum that could potentially be smaller than that of a 2-element system. Referring to FIG. 7, a lens design is shown with a thickness of only about 2 mm over an 8 mm diameter aperture. The 2-element system requires limited thickness because of the plano-convex configuration.

As the invention has been described, it will be apparent to those skilled in the art that the same may be varied in many ways without departing from the spirit and scope of the invention. Any and all such modifications are intended to be included within the scope of the appended claims.

What is claimed is:

1. A system for shaping a laser beam from a non-uniform spatial profile to a flat-top or uniform spatial profile comprising:

an input laser beam having an input energy density and a maximum beam radius;

a system magnification factor;

a lens including a first and second aspheric surface;

a central ray having a central optical path length;

a plurality of arbitrary rays having an optical path length equal to said central optical path length;

said first aspheric surface having a curvature profile defined by the equation:

$$Z=(n_2^2-n_0^2)^{-1}\{[(n_1n_2-n_0^2)z+n_2C]\pm n_0[(C+n_1\gamma_1n_2z)^2+(n_2^2-n_0^2)(R-r)^2]^{1/2}\} \quad (4)$$

and said second aspheric surface having a curvature profile defined by the equation:

$$z'=\{(R-r)(Z-z)\pm\gamma_1(R-r)[(Z-z)^2+(R-r)^2]^{1/2}\}/[(\gamma_1^2-1)(Z-z)^2+\gamma_1^2(R-r)^2] \quad (6)$$

where $n_0$ is the refraction index of the medium, $n_1$ is the refraction index of said first aspheric surface, $n_2$ is the refraction index of said second aspheric surface, r and z are the radial and axial values at said first aspheric surface, R and Z are the radial and axial values at said second aspheric surface, C is a constant determined at the condition where the optical path length of said arbitrary rays are equal to said optical path length of said central ray, and $\gamma_1=n_1/n_2$.

2. The system of claim 1 wherein the index of refraction between said first and second aspheric surfaces is greater than the index of refraction beyond said first and second aspheric surfaces.

3. The system of claim 2 wherein said lens is constructed of fused silica.

4. The system of claim 1 wherein said laser beam includes a wavelength; and said curvature profile of said first aspheric surface has a horizontal axial component.

* * * * *